United States Patent
Ichii et al.

(10) Patent No.: US 6,529,530 B1
(45) Date of Patent: Mar. 4, 2003

(54) MULTIPLEX COMMUNICATING METHOD

(75) Inventors: Eiji Ichii, Hiratsuka (JP); Hiroo Moriue, Hiratsuka (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/367,614

(22) PCT Filed: Dec. 24, 1998

(86) PCT No.: PCT/JP98/05871

§ 371 (c)(1),
(2), (4) Date: Aug. 17, 1999

(87) PCT Pub. No.: WO99/34559

PCT Pub. Date: Jul. 8, 1999

(30) Foreign Application Priority Data

Dec. 24, 1997 (JP) ............................................. 9-355229

(51) Int. Cl.[7] ............................. H04J 1/16; H04L 1/00; G06F 11/00; G08C 15/00; G05B 23/02
(52) U.S. Cl. ...................... 370/537; 370/241; 370/244; 370/357; 370/432; 370/464; 340/3.4
(58) Field of Search ................................. 370/216, 251, 370/227, 241, 244, 250, 450, 535, 447, 462, 432, 357, 360; 340/825.06, 825.08, 825.5; 714/748, 749

(56) References Cited

U.S. PATENT DOCUMENTS

| | | | | |
|---|---|---|---|---|
| 5,272,699 A | * | 12/1993 | Nobutoki et al. | 370/216 |
| 5,305,316 A | * | 4/1994 | Yoshida et al. | 370/357 |
| 5,343,475 A | * | 8/1994 | Matsuda et al. | 370/432 |
| 5,357,525 A | * | 10/1994 | Moriue et al. | 714/748 |
| 5,408,227 A | * | 4/1995 | Hirabayashi et al. | 340/3.1 |
| 5,414,717 A | * | 5/1995 | Matsumoto et al. | 714/748 |
| 5,483,517 A | * | 1/1996 | Kurata et al. | 370/241 |
| 5,513,175 A | * | 4/1996 | Ichii et al. | 370/251 |
| 5,596,588 A | * | 1/1997 | Nobutoki et al. | 714/748 |
| 5,757,773 A | * | 5/1998 | Tsuji | 370/241 |
| 5,825,749 A | * | 10/1998 | Terayama et al. | 370/244 |
| 5,835,537 A | * | 11/1998 | Ichii et al. | 375/295 |
| 5,940,366 A | * | 8/1999 | Moriue et al. | 370/216 |

FOREIGN PATENT DOCUMENTS

| | | |
|---|---|---|
| JP | 5-58233 | 9/1993 |
| JP | 6-292274 | 10/1994 |
| JP | 7-38566 | 2/1995 |
| JP | 9-135257 | 5/1997 |

* cited by examiner

Primary Examiner—Huy D. Vu
Assistant Examiner—M. Phan
(74) Attorney, Agent, or Firm—Frishauf, Holtz, Goodman & Chick, P.C.

(57) ABSTRACT

When a CPU core 53 of a node detects change of data which comes into the node from a load 60 connected thereto on the input side, and thereby the CPU core 53 and a transmission control circuit 52 wake up, the node transmits a frame for waking-up to a transmission line 4. However, when the node receives a frame for waking-up from another node via the transmission line 4 and thereby wakes up, the node does not transmit a frame for waking-up. Thus, an increase in traffic at the time of waking up is reduced and data transmission in a normal operation mode is started soon, so that the speed of data transmission is increased.

6 Claims, 6 Drawing Sheets

MULTIPLEX COMMUNICATING METHOD

TECHNICAL FIELD

The present invention relates to a multiplex transmission method in which a multiplex transmission apparatus switches its operation mode from a power saving operation mode to a normal operation mode to perform multiplex data transmission.

BACKGROUND ART

Conventionally, a plurality of multiplex transmission apparatuses (hereinafter referred to as "nodes") are connected to a transmission line consisting of, for example, twisted pair wires to construct a multiplex transmission network system. Multiplex transmission with such a system is adopted, for example, in a local area network (LAN) in an automobile provided for performing multiplex data transmission using CSMA/CD transmission method.

Each node has a microcomputer including a CPU core, a transmission control circuit, and an input port. The microcomputer is connected to a generating circuit and operates with a clock signal generated by the generating circuit.

A signal coming in from a switch or the like is forwarded to the input port of the microprocessor through an input circuit. When a value at the input port has changed or predetermined time has passed, the CPU core instructs the transmission control circuit to transmit a frame. Receiving from the CPU core an instruction to transmit a frame, the transmission control circuit arranges data forwarded from the CPU core in the form of a frame and transmits the frame to other nodes connected to the transmission line.

As an operation mode, each node has a normal operation mode in which it does normal operation for performing data transmission with other nodes and a power saving operation mode in which it operates with saved power to thereby reduce power consumption when the system does not need to be active. Specifically, the power saving operation mode is an operation mode in which the operation of the generating circuit is stopped to thereby reduce power consumption, for example, when a signal coming from a switch continues to be inactive and the node itself continues to be inactive.

When the node is in the power saving operation mode, if a signal coming from a switch or the like changes or a frame for mode switch instruction comes in from the transmission line (for example, bus), the node needs to become active. Therefore, the CPU core makes the generating circuit start operation again to thereby switch the operation mode to the normal operation mode (This mode switching is referred to as "waking-up"). For this purpose, the node is adapted to take in, with its input port for waking-up, a frame forwarded through the transmission line and a signal coming from a predetermined switch, and when the nodes detects a change of the signal or a frame's coming in while the node is in the power saving operation mode, the node wakes up.

After waking up, the node immediately transmits a frame for wake-up instruction to the other nodes to thereby inform them that the node itself has switched to the normal operation mode, and then performs normal data transmission.

According to the above transmission method, however, if the whole system is in the power saving operation mode, and then if one node transmits a frame for waking-up to the other nodes, each of the other nodes wakes up and then transmits a frame for waking-up. Thus, according to the above transmission method, traffic on the transmission line may much increase at the time of waking-up.

As a result, at the time of waking-up, a trouble may happen such that a node which seeks to transmit data about a change of a switch is made to wait, and it takes time to perform data transmission.

For example, if the above transmission method is used in a multiplex data transmission system provided in an automobile, the following trouble may happen: when a door is to be opened with a door lock switch, a node which seeks to transmit data about a change of the door lock switch is made to wait due to an increase in traffic at the time of waking-up. Thus, there may be a time lag of 1 to 2 seconds after the door lock switch is handled until the door lock motor starts to operate. If the multiplex transmission system includes a large number of nodes, the time lag may be so large as 3 to 5 seconds. Thus, there are difficulties in using the above transmission method in a multiplex transmission system for an automobile, because in an automobile, for example, an actuator (lump, motor, or the like) needs to start to operate immediately when a switch is handled.

DISCLOSURE OF THE INVENTION

The present invention has been made in consideration of the above problems. An object of the present invention is to provide a multiplex transmission method which can reduce an increase in traffic at the time of waking up and perform data transmission rapidly.

Another object of the present invention is to reduce unnecessary transmission of a wake-up instruction.

Another object of the present invention is to transmit the latest predetermined data at the time of transmitting a wake-up instruction.

In order to achieve the above objects, according to the present invention, a plurality of nodes each having, as an operation mode, a power saving operation mode and a normal operation mode are connected to a common transmission line, and each of the nodes switches, based on a wake-up instruction, from the power saving operation mode to the normal operation mode to perform multiplex transmission. Each node judges whether a wake-up instruction has come from itself or from another node, and only when the wake-up instruction has comes from itself, transmits a wake-up instruction at regular intervals.

Specifically, when a node wakes up due to change of a signal coming into the node, the node transmits a wake-up instruction, but when the node wakes up due to a frame which has come to the node from another node, the node does not transmit a wake-up instruction in order to reduce an increase in traffic at the time of waking up and soon perform normal data transmission.

It is desirable that each of nodes which have received a wake-up instruction transmitted by one node transmits an acknowledgment signal, and the one node which is transmitting the wake-up instruction stops transmitting the wake-up instruction when it has received acknowledgment signals from all the other nodes in order to avoid unnecessary transmission of the wake-up instruction.

It is desirable that a node transmits predetermined data along with a wake-up instruction at the time of transmitting the wake-up instruction, and that the data transmitted along with the wake-up instruction is data renewed to be the latest so that the node may always transmit the latest data.

BRIEF DESCRIPTION OF THE DRAWINGS

The drawings relate to one embodiment of the present invention.

BEST MODE OF CARRYING OUT THE INVENTION

An embodiment of the present invention will be described with reference to FIGS. 1 to 6.

Figure 1:
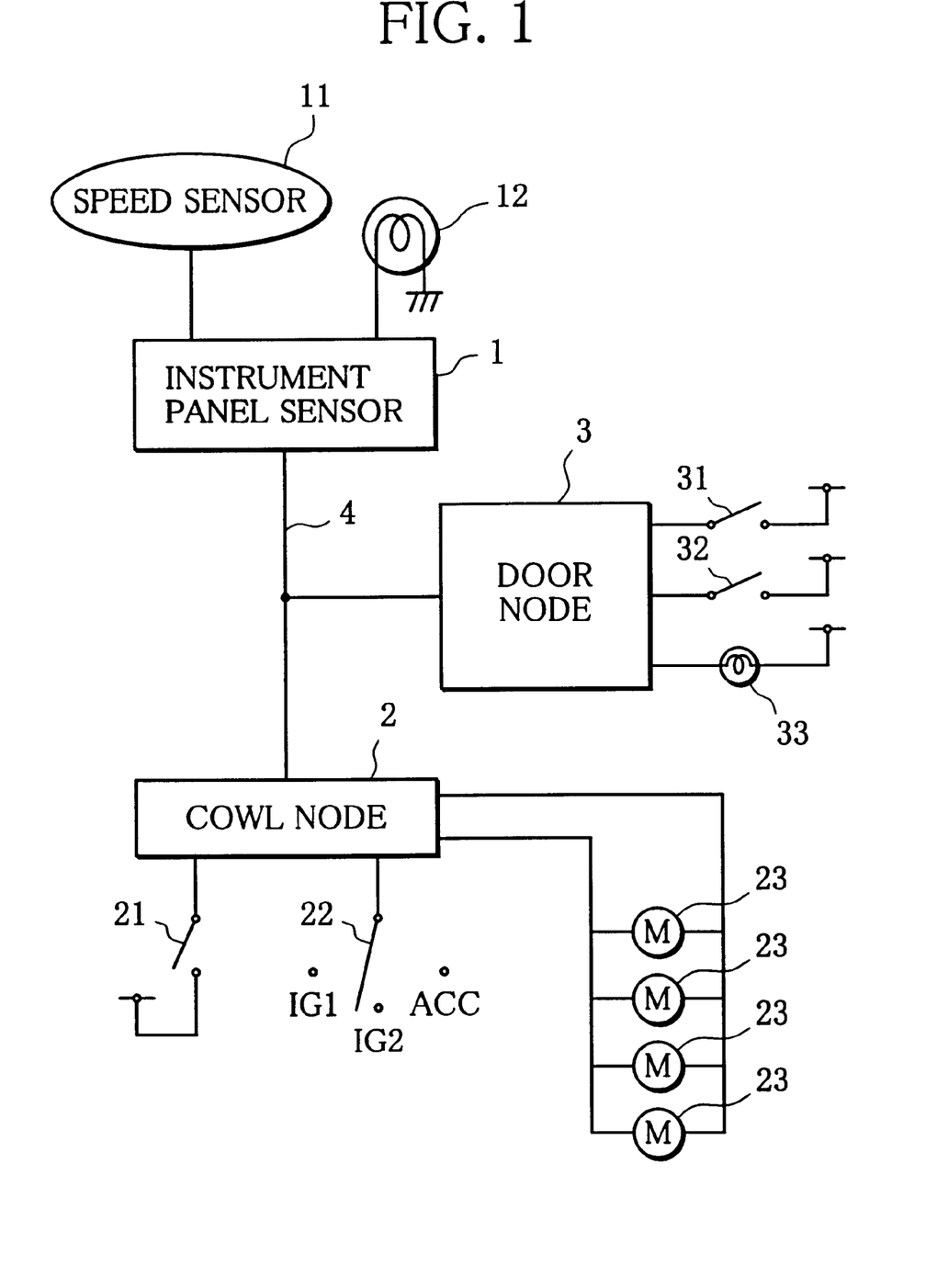
FIG. 1 is a diagram showing an example of structure of a multiplex transmission system for a LAN provided in an automobile which uses a multiplex transmission method according to the present invention.

FIG. 1 is a diagram showing an example of structure of a multiplex transmission system for a LAN provided in an automobile which uses a multiplex transmission method according to the present invention.

As shown in FIG. 1, the multiplex transmission system is, as an example, used for controlling an electric system in an automobile. In the multiple transmission system, various switches, sensors and actuators provided at their positions are connected to appropriate nodes via harnesses (wires in the automobile). For example, as shown in FIG. 1, nodes 1 to 3 are connected to a transmission line 4 through interface circuits (described later), and transmit and receive data in the form of a frame among themselves. In the multiplex transmission system, the topology of the transmission line 4 may be any of a bus type, a daisy chain type, a star type and the like.

Among the nodes, the instrument panel node 1 is provided in the vicinity of various meters (not shown). A speed sensor 11 and an indicator lamp 12 are connected to the instrument panel node 1. The instrument panel node 1 transmits, to the other nodes, data coming from the speed sensor 11. Further, receiving from a cowl node 2 a signal corresponding to an on/off-state of a door switch 21, the instrument panel node 1 puts on or off an indicator lamp 12 in accordance with the signal.

The cowl node 2 is provided in the vicinity of a cowl portion (not shown). The door switch 21, an ignition switch 22 and motors 23 are connected to the cowl node 2. The cowl node 2 transmits, to the other nodes, a signal corresponding to an on/off-state of the door switch 21, and information about how the ignition switch 22 is connected. Further, receiving from a door node 3 a signal corresponding to an on/off-state of a door lock switch 31 and an on/off-state of a door unlock switch 32, the cowl node 2 controls driving of the motors 23 in accordance with the signal to effect centralized locking or unlocking of all doors (not shown).

The door node 3 is provided in a door (not shown). The door lock switch 31, the door unlock switch 32 and a courtesy lamp 33 are connected to the door node 3. The door node 3 transmits, to the other nodes, a signal corresponding to an on/off-state of the door lock switch 31 and an on/off-state of the door unlock switch 32. Further, receiving from the cowl node 2 a signal corresponding to an on/off-state of the door switch 21, the door node 3 puts on or off the courtesy lamp 33 in accordance with the signal.

The nodes 1 to 3 have their own physical addresses. For example, physical addresses "1", "2" and "3" are assigned to the instrument panel node 1, the cowl node 2 and the door node 3, respectively.

Figure 2:
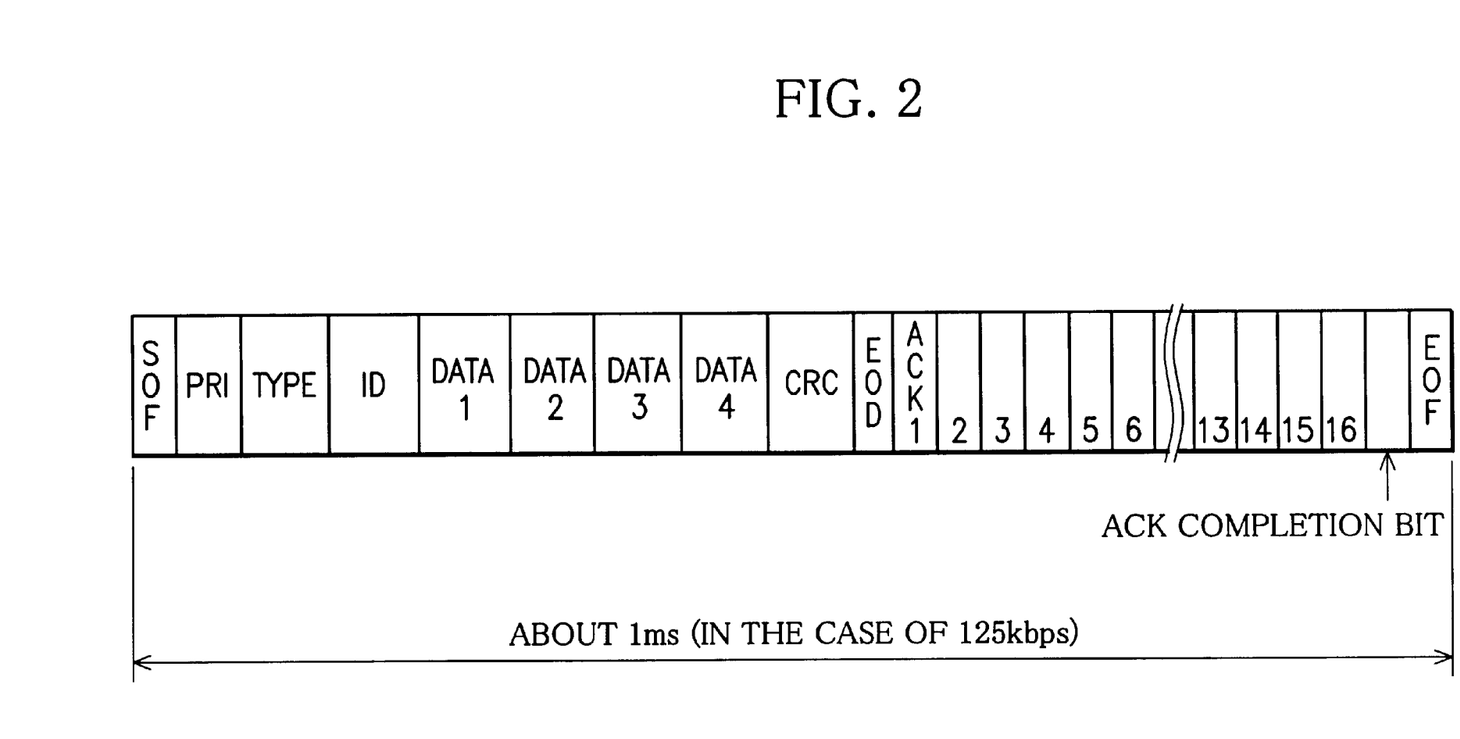
FIG. 2 shows an example of format of a frame used in the multiplex transmission system shown in FIG. 1.

The format of a frame transmitted among the nodes is as shown in FIG. 2. Specifically, the frame consists of a SOF (Start of Frame) field, a priority (PRI) field next to the SOF field, a frame type (TYPE) field, an identification data (ID) field, data (DATA) fields, a CRC field, an EDO (End of Data) field, an ACK (acknowledgment) signal field, an ACK completion bit and an EOF (End of Data) field.

Here, the SOF field is a field for (data) indicating the start of the present frame, the PRI field is a field for data determining the priority of the present frame in case a plurality of nodes transmit frames to the transmission line at the same time, and the TYPE field is a field for indicating the length of data, the type of the frame and the like. The ID field is a field for indicating the content of the DATA fields which follow the ID field, and the DATA fields are fields for data having the length indicated in the TYPE field. For example, DATA fields 1 to 4 have a length of 8 bits each. The CRC field is a field for an error check code, and the EOD field is a field for indicating the end of data. The ACK signal field is a field consisting of, for example, 16 bits provided for ACK signals returned from all nodes, and each bit corresponds to one of the nodes. The ACK completion field is a field of 1 bit for indicating that all the nodes included in the system have returned ACK signals, and the EOF field is a field for indicating the end of the frame.

Here, it is supposed that in the present embodiment, the above frame is transmitted at a transmission speed of, for example, 125 kbps, and that it takes about 1 ms to transmit one frame.

Each node returns an ACK signal to a position in the ACK signal field corresponding to its own physical address, when it has received normally a frame transmitted through the transmission line 4 up to the EOD thereof. In the present embodiment, for example, the instrument panel node 1, the cowl node 2 and the door node 3 return their ACK signals to positions denoted by ACK1, ACK2 and ACK3 in the ACK signal field shown in FIG. 2, respectively. In the present embodiment, if not all the nodes have returned ACK signals, retransmission is performed three times at most.

Figure 3:
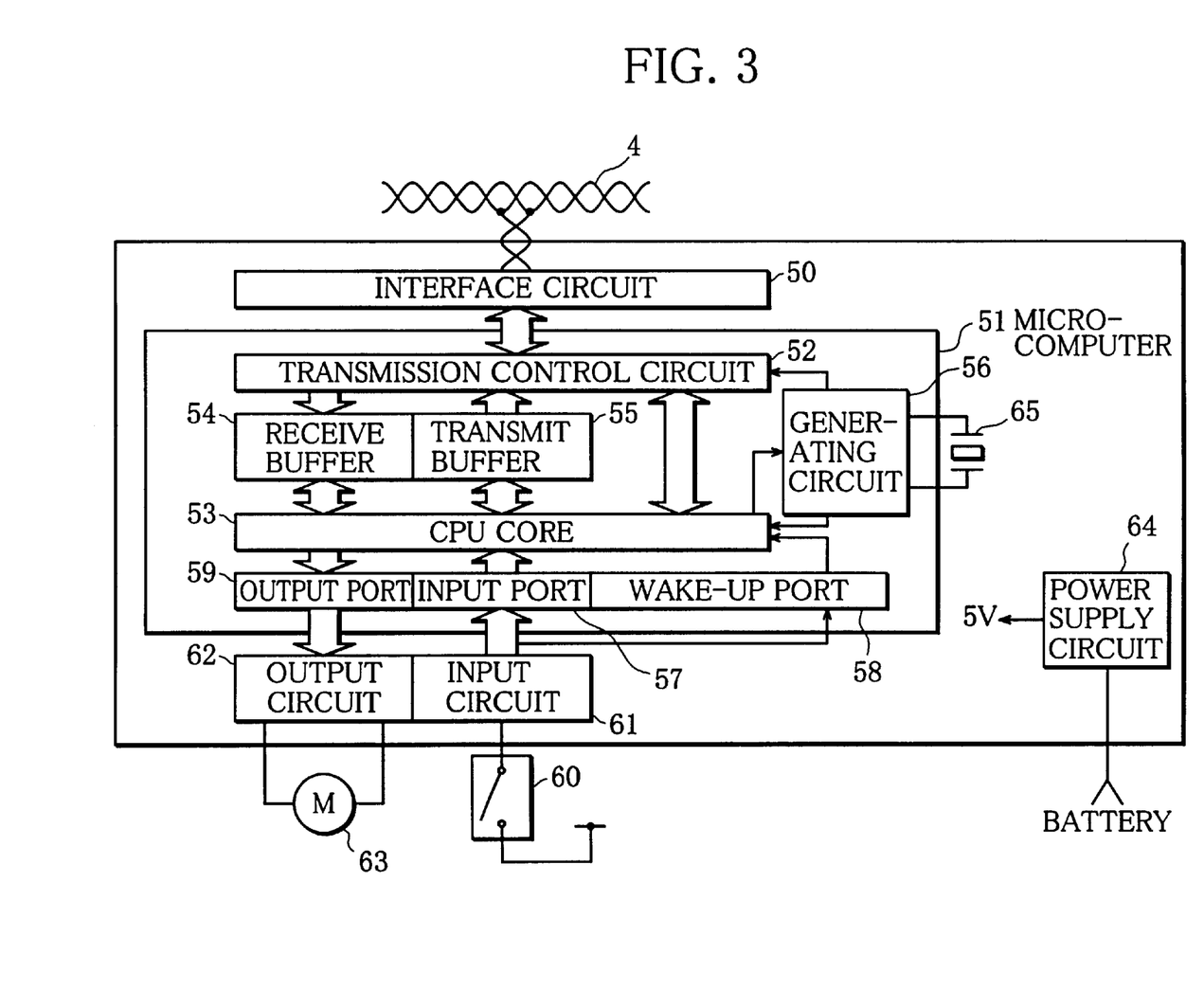
FIG. 3 is a diagram showing an example of structure of a node shown in FIG. 1.

FIG. 3 is a diagram showing an example of structure of each node shown in FIG. 1. As shown in FIG. 3, each node comprises an interface circuit 50 to be connected to the transmission line 4, a microcomputer 51 for transmitting and receiving data in a normal operation mode, an input circuit 61 for taking in a signal coming from a load 60 on the input side such as a switch and forwarding it to the microcomputer 51, an output circuit 62 for receiving a signal from the microcomputer 51 and forwarding it to a load 63 on the output side such as a motor, a power supply circuit 64 for transforming a voltage of 12V supplied by a battery to an operating voltage for each circuit in the node, for example, a voltage of 5V and supplying power of that voltage, and a generator 65 for generating a predetermined signal for the microcomputer 51.

The microcomputer 51 comprises a transmission control circuit 52 having a function of multiplex transmission, a CPU core 53 for controlling transmit/receive and input/output of data, a receive buffer 54 and a transmit buffer 55 provided between the transmission control circuit 52 and the CPU core 53 for temporarily storing receive data and transmit data, a generating circuit 56 for generating a clock signal based on a pulse signal generated by the generator 65 and supplying it to the transmission control circuit 52 and the CPU core 53, an input port 57 for taking in a signal from the input circuit 61, a wake-up port 58 for taking in data coming from a predetermined load on the input side and informing the CPU core 53 of waking-up, and an output port 59 for forwarding a signal from the CPU core 53 to the output circuit 62.

When the CPU core 53 detects change of data coming from the wake-up port 58 while it is in a power saving operation (hereinafter referred to as "sleep") mode, it wakes up, that is, switches to a normal operation mode to transmit and receive data to and from other nodes.

Figure 4:
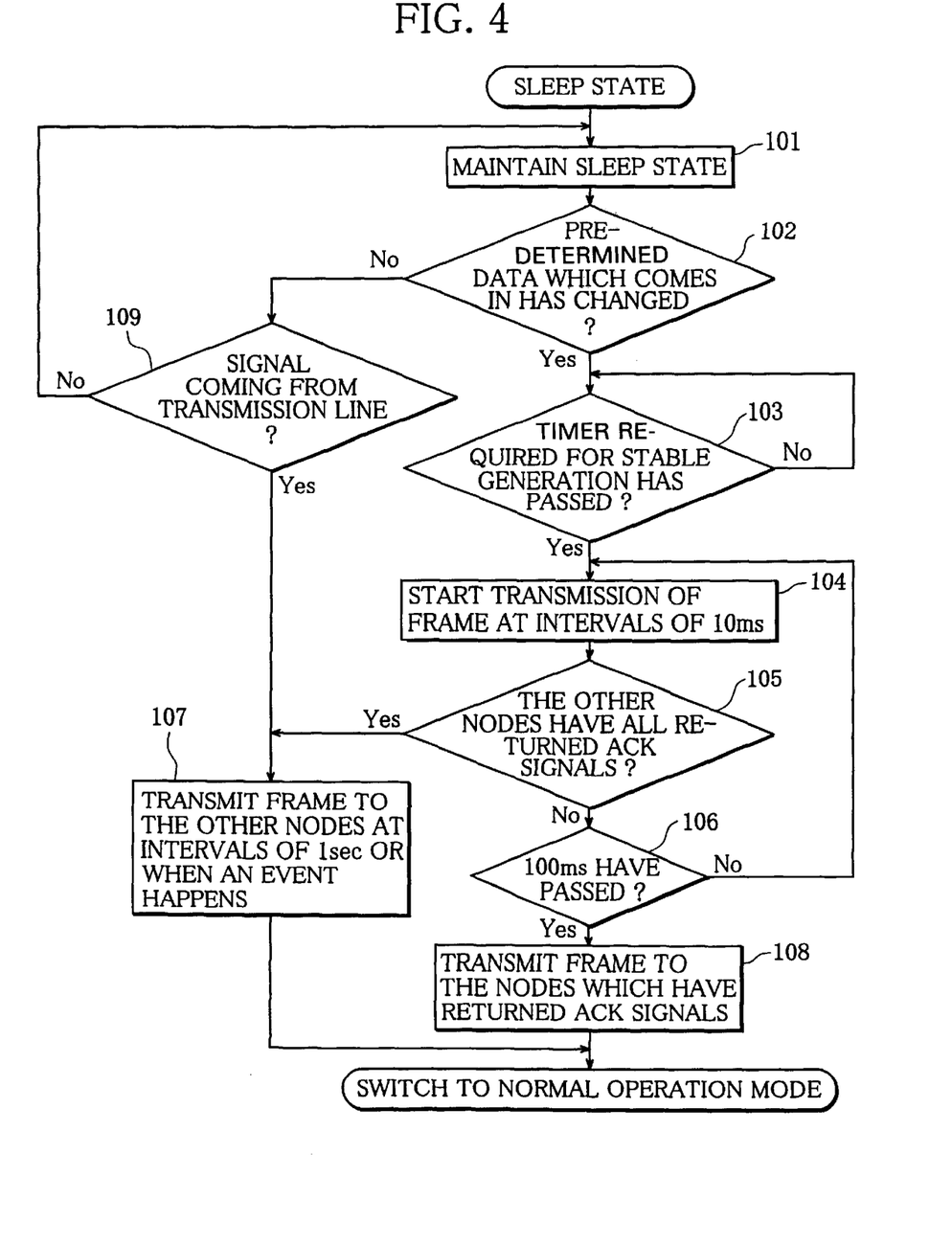
FIG. 4 is a flowchart for explaining how to switch from a sleeping mode to a normal operation mode.

Next, switching from the sleep mode to the normal operation mode will be described based on a flowchart of FIG. 4. While the sleep mode is maintained in step 101 of FIG. 4, signals are coming from loads on the input side such as the switch 60 into the input circuit 61. Among those signals, a signal coming from a predetermined load is forwarded to the wake-up port 58 and the other signals are forwarded to the input port 57.

The CPU core 53 detects change of the signal coming from the predetermined load into the wake-up port 58, for example, a change from an off-state to an on-state of the signal (step 102). If a change is detected at the wake-up port 58, the present operation of the CPU core 53 is interrupted, and the CPU core 53 sets up a change-at-wake-up-port detecting flag provided in the CPU core 53.

After the interruption of the operation of the CPU core 53 thus happens, the CPU core 53 controls, in order to switch to the normal operation mode, the generating circuit 56 to start operation and waits for a predetermined time, for example, 20 ms so that the clock signal generation by the generating circuit 56 may become stable (step 103). After the predetermined time has passed, the transmission control circuit 52 and the CPU core 53 wake up. The CPU core 53 checks the change-at-wake-up-port detecting flag, and after checking that the flag is set up, controls the transmission control circuit 52 to start transmission of a frame for waking-up (step 104). It is desirable that transmission of a frame for waking-up is performed at intervals of 5~10 ms so that unoccupied time a may be left to the transmission line even if transmission of that frame is performed four times at most, including retransmissions (1 ms×4+α). Here, it is supposed that in the present embodiment, transmission of a frame for waking-up is performed at intervals of 10 ms.

In order to discriminate transmission of a frame for waking-up from transmission of a frame in the normal operation mode, a predetermined one bit in the DATA fields of the frame shown in FIG. 2 is used as a wake-up bit. A node which has received a frame for waking-up judges that it is a frame for waking-up because the wake-up bit is set in a state of "1". The wake-up bit is set in a state of "0" when a frame is transmitted in the normal operation mode. It is also possible to discriminate a frame for waking-up by making an indication, for example, in the TYPE field of the frame.

When a frame for waking-up is to be transmitted, the CPU core 53 writes predetermined data in the transmit buffer 55, and thereby adds it in the DATA fields of the frame for waking-up so that the predetermined data may be transmitted with the frame for waking-up. Predetermined data added to a frame for waking-up is data based on a signal coming from the input port 57 or the wake-up port 58. When data to be added to a frame for waking-up is renewed, the old data in the frame is replaced by the new data so that at any time, the latest data may be transmitted with the frame.

Next, the CPU core 53 judges whether all the nodes have returned ACK signals to the frame for waking-up (step 105).

If not all the nodes have returned ACK signals, the CPU core 53 judges whether time enough to surely wake up the other nodes even if temporary trouble due to noise on the transmission line or the like happens, for example, time of 100 ms has passed (step 106). The CPU core 53 returns to step 104 to transmit the frame for waking-up at intervals of 10 ms if the above-mentioned time of 100 ms has not passed. If all the nodes have returned ACK signals within the above-mentioned time of 100 ms, the present node stops transmission of the frame for waking-up. Then the present node switches to the normal operation mode, sets the wake-up bit of a frame in a state of "0" and transmits a frame including predetermined data to the other nodes at intervals of 1 sec or when an event of which the other nodes are to be informed happens (step 107).

If the above-mentioned time of 100 ms has passed but not all the nodes have returned ACK signals, the present node switches to the normal operation mode and transmits a frame including predetermined data to the nodes which have returned ACK signals (step 108).

If in step 102, no change is detected at the wake-up port 58, the CPU core 53 judges whether a signal coming from the transmission line 4 has changed (step 109). For example, if another node transmits a frame for waking-up to the transmission line 4, the transmission control circuit 52 detects a change of a signal coming from the transmission line 4 through the interface circuit 50. Then the transmission control circuit 52 interrupts the present operation of the CPU core 53, and the CPU core 53 sets up a change-of-signal-from-transmission-line detecting flag which is provided in the CPU core 53.

The CPU core 53 wakes up and checks the change-of-signal-from-transmission-line detecting flag. After checking that the flag is set up, the CPU core 53 makes the generating circuit 56 start operation and proceeds to step 107 and switches to the normal operation mode without transmitting a frame for waking-up. Then, the CPU core 53 sets a wake-up bit in a frame in a state of "0" and controls the transmission control circuit 52 to transmit a frame including predetermined data.

Next, switching from the sleep mode to the normal operation mode in the multiplex transmission system for a LAN provided in an automobile shown in FIG. 1 will be described using a time chart of FIG. 5. While the whole system is in the normal operation mode, if, for example, the cowl node 2 comes into an inactive state because switches such as the door switch 21 and the ignition switch 22 are in an off-state, there is no data to be transmitted in the form of a frame, there is no receive data to be processed, other functions not related to transmission are not active either, and so on, the CPU core of the cowl node 2 stops the operation of the generating circuit to stop the clock signal to thereby stop the present operation of the transmission control circuit and the CPU core and switches to the sleep mode. Also the instrument panel node 1 and the door node 3 switch to the sleep mode if they come into an inactive state.

The sleep mode is required, for example, in the multiplex transmission system for a LAN provided in an automobile, for preventing a battery from drying when a driver parks and leaves an automobile.

For example, when the door is unlocked and the door unlock switch 32 comes into an on-state while the whole system is in the sleep mode, the system needs to become active again. Therefore, a switch on the input side whose state may be changed while the system is in the sleep mode (for example, in an automobile, a switch on the input side which operates with +B power supply) is connected to the wake-up port of a microcomputer which can detect change even when the microcomputer is in the sleep mode.

Thus, the door unlock switch 32 is connected to the wake-up port of the door node 3. When a signal coming from the door unlock switch 32 changes (see FIG. 5(A)), the present operation of the CPU core is interrupted and the generating circuit starts its operation. After about 20 ms have passed and the generation has become stable, the generating circuit starts to send out a clock signal based on a pulse sent out by the generator at regular intervals, so that the transmission control circuit and the CPU core become active (wake up) (see FIG. 5(D)).

Figure 5:
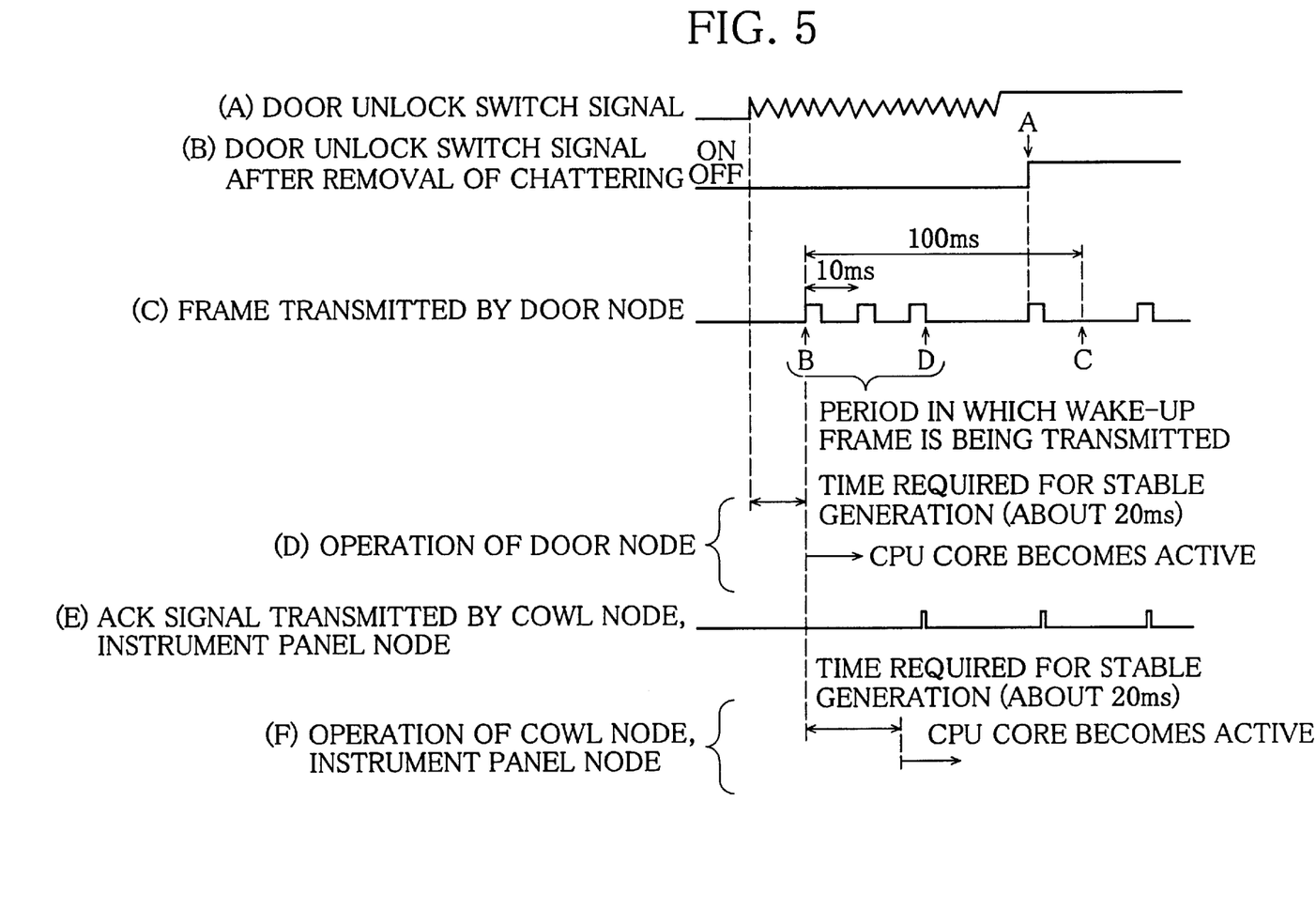
FIG. 5 is a time chart for explaining an example of how the nodes shown in FIG. 1 operate.

When the door node 3 wakes up, the door node 3 starts transmission of a frame for waking-up to which data about a signal before removal of chattering coming from the door unlock switch (signal in an off-state) is added, at intervals of 10 ms (see FIG. 5(C)).

The frame for waking-up transmitted to the transmission line 4 is received by the instrument panel node 1 and the cowl node 2. In each of the nodes 1, 2, the CPU core checks the change-of-signal-from-transmission-line detecting flag, after about 20 ms have passed since the generating circuit has started its operation (see FIG. 5(F)). After checking that the flag is set up, the CPU core switches to the normal operation mode without transmitting a frame for waking-up. Then, the nodes 1, 2 return ACK signals to the transmission line 4 if they have normally received the frame for waking-up transmitted by the door node 3 (see FIG. 5(E)).

When the door node 3 have received ACK signals from both nodes 1, 2 while it is performing transmission of the frame for waking-up, the door node 3 judges that all the nodes have waken up, and stops transmission of the frame for waking-up (see point D in FIG. 5(C)). This is because transmission of a frame for waking-up is to be performed with high frequency. Thus, in order to reduce traffic as soon as possible, the door node 3 switches to the normal operation mode when all the nodes have waken up.

After stopping the transmission of the frame for waking-up, the door node 3 sets the wake-up bit in a state of "0". At the time removal of chattering is finished (see point A in FIG. 5(B)), the door node 3 detects change of the door unlock switch 32, and transmits a frame including predetermined data in the normal operation mode.

Next, a case where trouble happens to the instrument panel node while it is in the sleep mode will be described using a time chart of FIG. 6.

Figure 6:
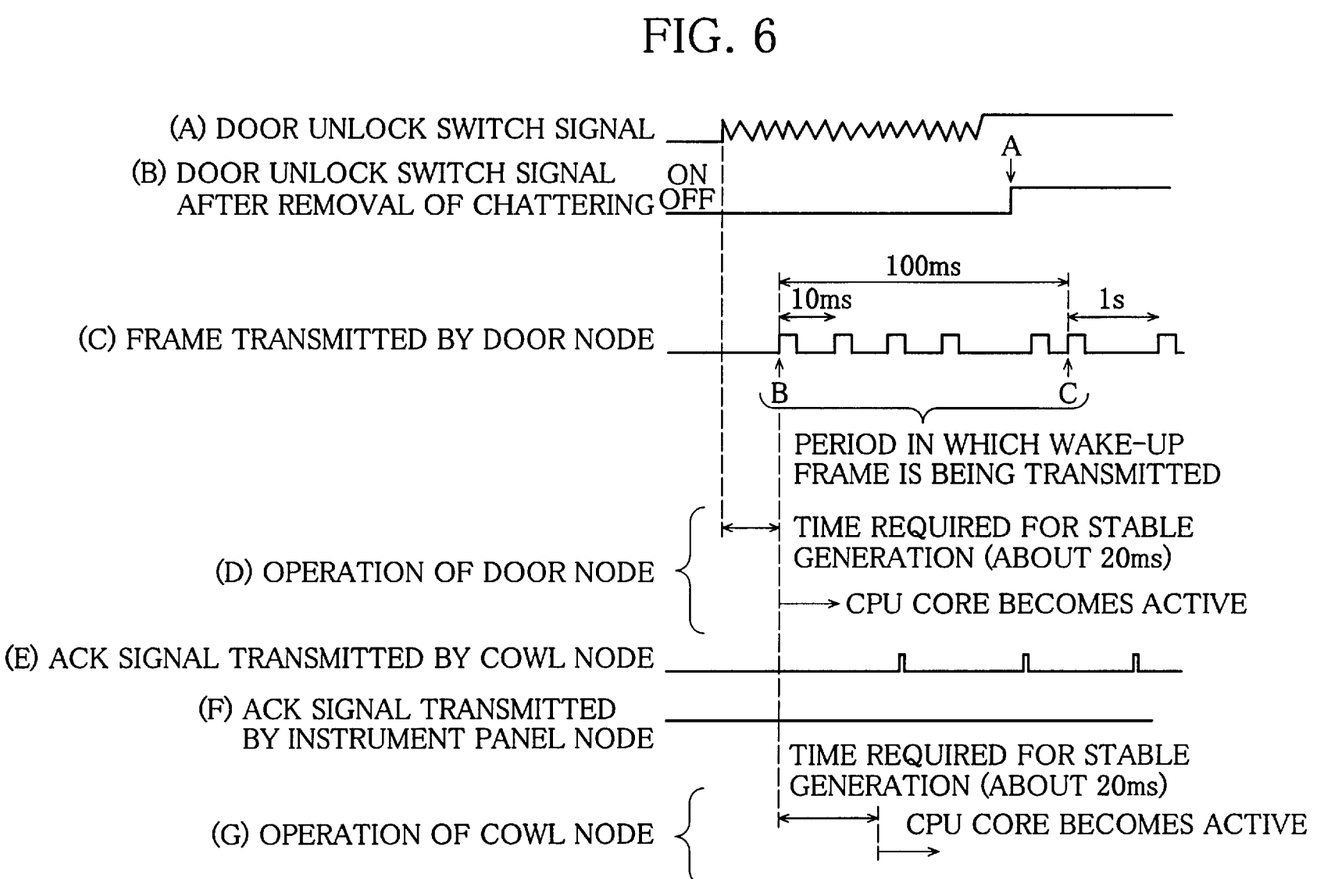
FIG. 6 is a time chart for explaining another example of how the nodes shown in FIG. 1 operate.

In the cowl node 2, after about 20 ms have passed, which is the time for waiting for the generation by the generating circuit to become stable, the CPU core becomes active (see FIG. 6(G)), and transmits an ACK signal to the received frame (see FIG. 6(E)). However, due to trouble, the instrument panel node 1 cannot receive a transmitted frame for waking-up and return an ACK signal (see FIG. 6(F)).

In that case, the door node 3 continues to transmit a frame for waking-up for 100 ms (FIG. 6(C)). Since a signal coming from the door unlock switch 32 is in an-off state until point A as shown in FIG. 6(B), the frame for waking-up is transmitted in which "0" is added as data about the state of the door unlock switch. At point A, however, removal of chattering of the door unlock switch 32 is finished as shown in FIG. 6(A), and a signal coming from the door unlock switch 32 comes into an on-state. Therefore, "1" is added to a frame as data about the state of the door unlock switch to replace the above "0", and then the frame is transmitted. Thus, in the present embodiment, the cowl node can receive data about the state of the door unlock switch without delay in spite of trouble of the instrument panel node.

As described above, in the present embodiment, among a plurality of nodes, only a node which has detected change of data coming from a load connected thereto on the input side and waken up performs transmission of a frame for waking-up. Other nodes which have received the frame for waking-up do not perform transmission of a frame for waking-up. Therefore, the present embodiment does not cause wasteful increase in traffic, and therefore ensures rapid data transmission.

In the present embodiment, each node does not perform transmission of a frame for waking-up when it has received a frame for waking-up from another node. Therefore, unnecessary transmission of a frame for waking-up is avoided, so that traffic is reduced.

Further, in the present embodiment, when a frame for waking-up is transmitted, renewed data about a switch or the like is transmitted therewith. Therefore, a node which receives the frame for waking-up can always obtain the latest data about the switch or the like. This also contributes to rapid data transmission.

The present invention is not limited to the above described embodiment. It can be modified variously within a scope not deviating from the gist thereof.

INDUSTRIAL USEFULNESS

As described above, in the multiplex transmission method of the present invention, a multiplex transmission apparatus judges whether an instruction to switch from a power saving operation mode to a normal operation mode comes from itself or from another multiplex transmission apparatus, and only when the instruction comes from itself, performs transmission of a mode switch instruction at predetermined intervals. Therefore, an increase in traffic at the time of waking-up is reduced, and rapid data transmission is ensured.

A multiplex transmission apparatus which has received the transmitted mode switch instruction transmits an acknowledgment signal. When the multiplex transmission apparatus which is performing transmission of the mode switch instruction has received acknowledgment signals from all multiplex transmission apparatuses, the multiplex transmission apparatus which is performing transmission of the mode switch instruction stops the transmission of the mode switch instruction. Therefore, unnecessary transmission of the mode switch instruction is avoided.

When a multiplex transmission apparatus transmits a mode switch instruction, it transmits predetermined data along therewith, and the transmitted predetermined data is data renewed to be the latest. Thus, each multiplex transmission apparatus can always transmit the latest predetermined data.

What is claimed is:

1. A multiplex transmission method for performing multiplex transmission among a plurality of multiplex transmission apparatuses connected to a transmission line, wherein the multiplex transmission apparatuses are each operable in a power saving operation mode and a normal operation mode, and wherein the multiplex apparatuses are each adapted to switch from the power saving mode to the normal operation, said method comprising:

detecting at each of the multiplex transmission apparatuses a change of input data;

transmitting a mode switch instruction from one of the multiplex transmission apparatuses at which the change of input data is detected;

judging at each of the multiplex transmission apparatuses whether the mode switch instruction has come from itself or from another one of the multiplex transmission apparatuses; and transmitting the mode switch instruction at regular intervals from the one of the multiplex transmission apparatuses at which the change of input data is detected, only when the mode switch instruction is judged to have come from itself.

2. The multiplex transmission method according to claim 1, further comprising:

receiving the mode switch instruction at each of the multiplex transmission apparatuses other than the one of the multiplex transmission apparatuses which transmits the mode switch instruction;

transmitting an acknowledgment signal from each of the multiplex transmission apparatuses which has received the mode switch instruction to the one of the multiplex transmission apparatuses which transmits the mode switch instruction;

stopping transmission of the mode switch instruction from said one of the multiplex transmission apparatuses when said one of the multiplex transmission apparatuses has received the acknowledge signal from all of the other multiplex transmission apparatuses.

3. The multiplex transmission method according to claim 1, wherein the one of the multiplex transmission apparatuses which transmits the mode switch instruction also transmits predetermined data along with the mode switch instruction at a time of transmitting the mode switch instruction.

4. The multiplex transmission method according to claim 2, wherein the one of the multiplex transmission apparatuses which transmits the mode switch instruction also transmits predetermined data along with the mode switch instruction at a time of transmitting the mode switch instruction.

5. The multiplex transmission method according to claim 3, wherein the predetermined data transmitted along with the mode switch instruction is renewed data.

6. The multiplex transmission method according to claim 4, wherein the predetermined data transmitted along with the mode switch instruction is renewed data.

* * * * *